M. J. B. BARBAROU.
SUPPORTING DEVICE FOR HEADLIGHTS OF MOTOR CARS.
APPLICATION FILED MAY 10, 1921.
1,410,873. Patented Mar. 28, 1922.
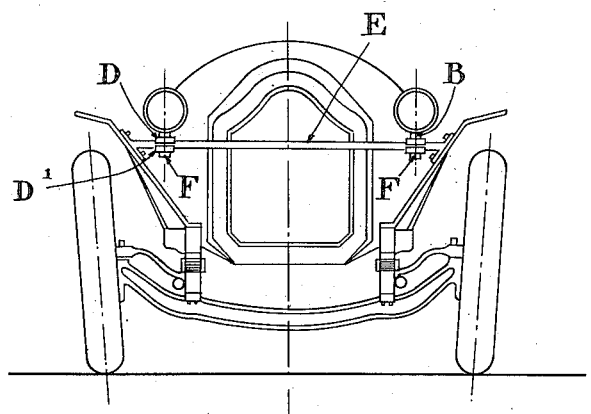
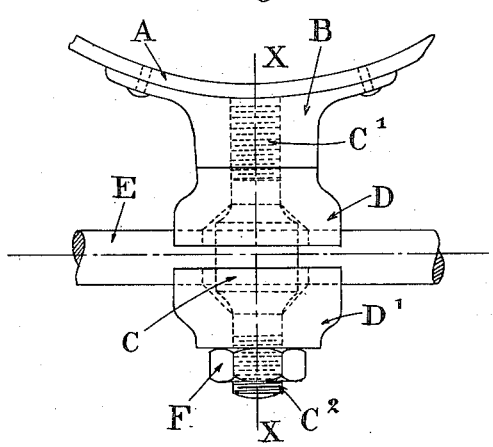 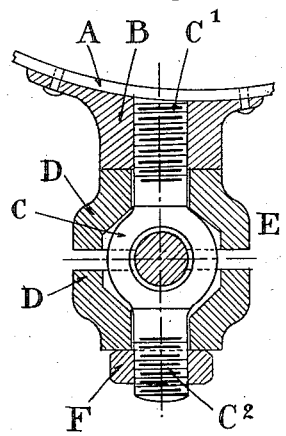
INVENTOR:
Marius Jean Baptiste Barbarou
By
his ATTORNEY.

UNITED STATES PATENT OFFICE.

MARIUS JEAN BAPTISTE BARBAROU, OF PARIS, FRANCE.

SUPPORTING DEVICE FOR HEADLIGHTS OF MOTOR CARS.

1,410,873.  Specification of Letters Patent.  Patented Mar. 28, 1922.

Application filed May 10, 1921. Serial No. 468,357.

*To all whom it may concern:*

Be it known that I, MARIUS JEAN BAPTISTE BARBAROU, citizen of the French Republic, residing at Paris, in the Republic of France, have invented new and useful Improvements in Supporting Devices for Headlights of Motor Cars, of which the following is a specification.

This invention has for its object a supporting device for headlights and lanterns of motor cars by means of which the headlights and lanterns may be rapidly mounted and taken off and also turned about very easily, the construction permitting to obtain the convergence of the light beams as well as the projection of the light at a greater or smaller distance on the ground.

In the accompanying drawing given by way of example:

Fig. 1 shows in front elevation an automobile vehicle provided with the device for supporting headlights and lanterns according to the invention.

Fig. 2 is a view in front elevation of the said device.

Fig. 3 is a vertical section on the line X—X (Fig. 2).

As shown in the drawing upon the casing of the headlight A, (Figs. 2 and 3) is secured a bushing or like member B which may be rivetted or soldered. In this bushing is screwed the screwthreaded end $C^1$ of a bolt C provided with an eye portion in its middle part which may be of spherical form. The opposite end $C^2$ of the bolt which is also screwthreaded carries a nut F.

Between the bushing B and the nut F, are clamped two shells D, $D^1$ which are provided on their inner faces with a semi-cylindrical notch and press between themselves the support of the headlights. The latter may be constituted by a tube or a bar E (Figs. 1, 2 and 3) and passes freely through the eye portion of the bolt C. The shells D, $D^1$ may be provided with inner conical surfaces as shown.

When the nut F is screwed down, the shells D and $D^1$ are brought towards each other, and the bar E is tightly clamped between said shells while on the other hand the contacting faces of the shell D and the bushing B will also be pressed tightly upon each other.

To turn the headlights about, it will be sufficient to slightly unscrew the nut F and to suitably rotate the headlight, either laterally about the threaded rod $C^1$ or in an upward or downward direction around the axle formed by the supporting bar E. The desired position being obtained the headlights are held in place by screwing down the nuts F.

Having now described my invention, what I claim as new and desire to secure by Letters Patent is:

A supporting device for headlights and lanterns of motor cars, comprising a bushing adapted to be secured to the headlight or lantern, a bolt having screwthreads at both ends and an intermediate eye part, said bolt being screwed at one end into said bushing, a nut screwed upon the opposite end of the bolt, a supporting rod extending through the eye portion of the bolt and two clamping members placed upon the bolt in the space between the bushing and the nut and adapted to clamp the supporting rod between themselves.

In testimony whereof I have signed my name to this specification.

MARIUS JEAN BAPTISTE BARBAROU.